(12) United States Patent
Webb

(10) Patent No.: US 10,569,663 B2
(45) Date of Patent: Feb. 25, 2020

(54) PLATFORM CONFIGURATIONS FOR AUTONOMOUS VEHICLES

(71) Applicant: UATC, LLC, San Francisco, CA (US)

(72) Inventor: Clifford Shaun Webb, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 0 days.

(21) Appl. No.: 16/045,081

(22) Filed: Jul. 25, 2018

(65) Prior Publication Data
US 2020/0009965 A1    Jan. 9, 2020

Related U.S. Application Data

(60) Provisional application No. 62/693,644, filed on Jul. 3, 2018.

(51) Int. Cl.
| | |
|---|---|
| *B62D 25/00* | (2006.01) |
| *B60L 50/50* | (2019.01) |
| *B60K 7/00* | (2006.01) |
| *B62D 25/20* | (2006.01) |
| *G05D 1/02* | (2020.01) |

(52) U.S. Cl.
CPC ............ *B60L 50/50* (2019.02); *B60K 7/0007* (2013.01); *B62D 25/20* (2013.01); *B60Y 2400/114* (2013.01); *G05D 1/021* (2013.01); *G05D 2201/0213* (2013.01)

(58) Field of Classification Search
CPC .......... B60L 11/18; B60L 50/64; B60L 58/10; B60K 1/00; B60K 35/00; B60K 7/0007; B60D 25/20
See application file for complete search history.

(56) References Cited

U.S. PATENT DOCUMENTS

| | | |
|---|---|---|
| 6,578,925 B1 | 6/2003 | Baker et al. |
| 9,453,536 B2 | 9/2016 | Vogler et al. |
| 9,636,988 B2 | 5/2017 | Pinschmidt |

(Continued)

OTHER PUBLICATIONS

Strategic Business Insights "Driverless Futures Scenario-Based Intelligence" Prospectus Fall 2015, 23 pages.

(Continued)

*Primary Examiner* — Hau V Phan
(74) *Attorney, Agent, or Firm* — Dority & Manning, PA

(57) ABSTRACT

The present disclosure is directed to autonomous vehicle platforms and autonomous vehicles including such platforms. For example, an autonomous vehicle can include a bisymmetrical platform including a first portion, a second portion, a third portion and a fourth portion that collectively provide a supporting structure for the autonomous vehicle and that respectively comprise a wheel mounting frame configured for location of a wheel assembly. A body including front and rear sides and first and second lateral sides can be positioned on top of the bisymmetrical platform configured to receive passengers for transport. The autonomous vehicle can also include a plurality of wheel assemblies configured for secure positioning relative to each wheel mounting frame within the bisymmetrical platform and a powertrain configured to power the plurality of wheel assemblies for operation of the autonomous vehicle to travel in either a forward direction or a rear direction.

20 Claims, 10 Drawing Sheets

(56) References Cited

U.S. PATENT DOCUMENTS

| | | | | |
|---|---|---|---|---|
| 2009/0183939 | A1* | 7/2009 | Smith | B60N 2/005 |
| | | | | 180/311 |
| 2016/0207418 | A1* | 7/2016 | Bergstrom | B60L 50/64 |
| 2016/0280235 | A1 | 9/2016 | Sugaiwa et al. | |
| 2017/0136842 | A1* | 5/2017 | Anderson | B60K 35/00 |
| 2017/0174205 | A1* | 6/2017 | Ricci | B60L 58/10 |
| 2018/0012433 | A1* | 1/2018 | Ricci | H04L 9/321 |
| 2018/0022387 | A1* | 1/2018 | Ta | B60K 1/00 |
| | | | | 180/291 |
| 2018/0022405 | A1* | 1/2018 | Gecchelin | B60D 1/36 |
| | | | | 701/23 |
| 2018/0056767 | A1 | 3/2018 | Dolgov et al. | |
| 2018/0072212 | A1* | 3/2018 | Alfaro | B60G 3/08 |

OTHER PUBLICATIONS

Sakti, Apurba, et al. "A techno-economic analysis and optimization of Li-ion batteries for light-duty passenger vehicle electrification" Journal of Power Sources 273 (2015) 966-980.

Mihaly, A., et al. "In-wheel vehicle control implementation with energy and safety considerations" 11 pages.

Kasgen, Johannes, et al. "Product Development & Testing Requirements for Electric Wheel Hub Motors" Data Analyses and Wheel Related Components. 10 pages.

Toyota Introduces Flexible Vehicle Platform for Businesses. www.themotorreport.com.au/car-article/motor-news/toyota-introduces-flexible-vehicle-platform-for-businesses-116851.html Accessed on Mar. 5, 2018.

* cited by examiner

PLATFORM CONFIGURATIONS FOR AUTONOMOUS VEHICLES

PRIORITY CLAIM

This application claims priority to U.S. Patent Application Ser. No. 62/693,644, filed Jul. 3, 2018, and entitled "PLATFORM CONFIGURATIONS FOR AUTONOMOUS VEHICLES," the disclosure of which is incorporated by reference herein in its entirety.

FIELD

The present disclosure relates generally to autonomous vehicles. More particularly, the present disclosure relates to platform configurations for autonomous vehicles.

BACKGROUND

An autonomous vehicle is a vehicle that is capable of sensing its environment and navigating with minimal or no human input. In particular, an autonomous vehicle can observe its surrounding environment using a variety of sensors and identify an appropriate path through such surrounding environment.

SUMMARY

Aspects and advantages of embodiments of the present disclosure will be set forth in part in the following description, or can be learned from the description, or can be learned through practice of the embodiments.

An example aspect of the present disclosure is directed to an autonomous vehicle comprising a bisymmetrical platform, a body, a plurality of wheel assemblies, and a powertrain. The bisymmetrical platform includes a first portion, a second portion, a third portion, and a fourth portion that collectively provide a supporting structure for the autonomous vehicle. Each of the first portion, the second portion, the third portion and the fourth portion respectively includes a wheel mounting frame configured for location of a wheel assembly. The body is positioned on top of the bisymmetrical platform and configured to receive passengers for transport. The body includes a front side, a rear side, and first and second lateral sides connecting the front side and the rear side. The plurality of wheel assemblies are configured for secure positioning relative to each wheel mounting frame within the bisymmetrical platform. The powertrain is configured to power the plurality of wheel assemblies for operation of the autonomous vehicle to travel in either a forward direction or a rear direction.

Another example aspect of the present disclosure is directed to an autonomous vehicle platform comprising a first portion, a second portion, a third portion, and a fourth portion that collectively provide a supporting structure for an autonomous vehicle. Each of the first portion, the second portion, the third portion and the fourth portion respectively comprises a wheel mounting frame configured for location of a wheel assembly. The first portion and the second portion collectively serve as a front portion of the autonomous vehicle platform and the third portion and the fourth portion collectively serve as a rear portion of the autonomous vehicle platform, wherein the front portion and the rear portion are symmetrical. The first portion and the third portion collectively form a first lateral side portion of the autonomous vehicle platform and the second portion and the fourth portion collectively form a second lateral side portion of the autonomous vehicle platform. The first lateral side portion and the second lateral side portion are symmetrical. The autonomous vehicle platform is configured for receiving a symmetrical body on top of the autonomous vehicle platform and for functioning as part of the autonomous vehicle configured to travel in either a forward direction or a rear direction.

A further example aspect of the present disclosure is directed to an electric autonomous vehicle comprising a bisymmetrical platform, a body, a plurality of wheel assemblies and an electric powertrain. The bisymmetrical platform includes a first portion, a second portion, a third portion, and a fourth portion that collectively provide a supporting structure for the electric autonomous vehicle. Each of the first portion, the second portion, the third portion and the fourth portion respectively comprise a wheel mounting frame configured for location of a wheel assembly. The first portion and the second portion collectively serve as a front portion of the bisymmetrical platform and the third portion and the fourth portion collectively serve as a rear portion of the bisymmetrical platform, wherein the front portion and the rear portion are symmetrical. The first portion and the third portion collectively form a first lateral side portion of the bisymmetrical platform and the second portion and the fourth portion collectively form a second lateral side portion of the bisymmetrical platform, wherein the first lateral side portion and the second lateral side portion are symmetrical. The body is positioned on top of the bisymmetrical platform and is configured to receive one or more passengers for transport. The body includes a front side, a rear side, and first and second lateral sides connecting the front side and the rear side. The plurality of wheel assemblies are configured for secure positioning relative to each wheel mounting frame within the bisymmetrical platform. The electric powertrain configured to power the plurality of wheel assemblies for operation of the electric autonomous vehicle to travel in either a forward direction or a rear direction.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
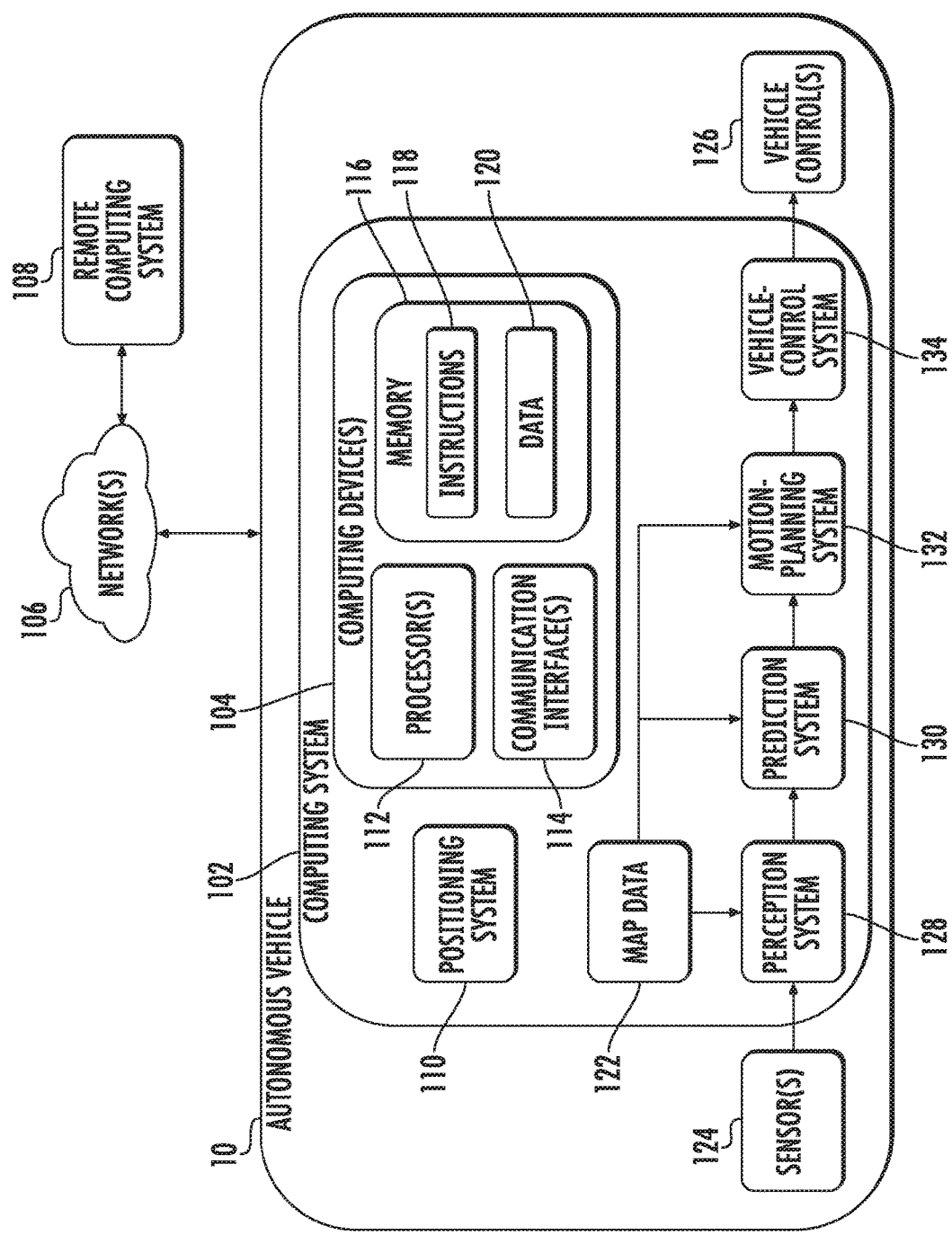
FIG. 1 depicts an example autonomous vehicle according to example embodiments of the present disclosure.

Example aspects of the present disclosure are directed to platform configurations for autonomous vehicles. In particular, an autonomous vehicle can include a bisymmetrical platform that accommodates formation of an autonomous vehicle that is replicated symmetrically across a vehicle centerline and also symmetrically across a wheelbase midpoint plane. Respective portions of the bisymmetrical platform are configured to provide a wheel mounting frame configured for location of a respective plurality of wheel assemblies. The wheel assemblies are securely positioned relative to each wheel mounting frame within the bisymmetrical platform and powered by a powertrain configured to operate the autonomous vehicle for bi-directional principal travel in either a forward direction or a rear direction. By providing an adaptable vehicle platform that is both bisymmetrical and bidirectional, an autonomous vehicle platform and associated body components can be reconfigured to produce various similar autonomous vehicle infrastructures with easily interchangeable and serviceable components. This configuration can be particularly advantageous in the context of a fleet of autonomous vehicles serving varying demands, customers, markets, and/or the like.

More particularly, an autonomous vehicle can include a vehicle platform including a plurality of portions. For example, the vehicle platform can include a first portion, a second portion, a third portion and a fourth portion that collectively provide a supporting structure (e.g., a vehicle frame or chassis) for the autonomous vehicle. In some implementations, each of the first portion, the second portion, the third portion and the fourth portion respectively comprise a wheel mounting frame configured for location of a wheel assembly. In some implementations, the first portion and the second portion collectively serve as a front portion of the platform and the third portion and the fourth portion collectively serve as a rear portion of the platform, such that front portion and the rear portion are symmetrical (e.g., symmetrical across a wheelbase midpoint plane). In some implementations, the first portion and the third portion collectively form a first lateral side portion of the platform and the second portion and the fourth portion collectively form a second lateral side portion of the platform, such that the first lateral side portion and the second lateral side portion are symmetrical (e.g., symmetrical across a vehicle centerline).

In some implementations, a vehicle platform can include one or more lightweight, recyclable, and/or sustainable materials (e.g., aluminum extrusion, aluminum casting, sheet-molding component (SMC) or other suitable materials). Lighter components can advantageously require less structure which in turn requires less energy to move, so performance and mass can be balanced. In some implementations, the platform can include aluminum extrusions with cast aluminum or additive layered built up nodes. Panels of the platform and/or body can include SMC panels having a bonded and riveted construction. Bonding using ambient temperature curing and riveting can advantageously reduce manufacturing energy requirements. Low toxicity coatings and reduction of volatile organic compounds (VOCs) can be incorporated to lessen environmental impact.

In some implementations, the autonomous vehicle platform can be configured for receiving a body on top of the autonomous vehicle platform and for functioning as part of an autonomous vehicle configured to principally travel in either a forward direction or a rear direction. When an autonomous vehicle further includes such a body, it can be configured to include an interior arrangement configured to receive passengers for transport. For example, an interior of an autonomous vehicle can include multiple different interior portions. Each of such interior portions can include one or more mechanical interfaces for coupling one or more modular interior units to the interior of the body. For example, such modular interior units can be configured to accommodate one or more passengers of the autonomous vehicle (e.g., via one or more included seats, and/or the like). The platform configuration as well as additional powertrain components of an autonomous vehicle can be configured to provide enhanced interior volume for the upper body, thus accommodating more spacious transport area for passengers or other cargo and allowing flexibility for different use cases.

In some more particular embodiments, the autonomous vehicle (and/or the body portion thereof) can include multiple sides. In some implementations, the autonomous vehicle and/or body of the autonomous vehicle can include one or more sides corresponding to either the front or the rear of the autonomous vehicle. For example, an autonomous vehicle can be configured to principally travel in either of two directions (e.g., the autonomous vehicle can be equally suited to travel in forward or reverse, the front and rear of the autonomous vehicle can be interchangeable, indistinguishable, and/or the like). In addition to the front/ rear sides, the autonomous vehicle and/or body can include lateral sides (e.g., first and second lateral sides) connecting the front/rear sides.

More particularly, in some implementations, the body of the autonomous vehicle can include one or more doors on one or more of the lateral sides for one or more passengers to enter and/or exit the autonomous vehicle. In some embodiments, one lateral side can include such door(s), while the other lateral side may not include such door(s). For example, an autonomous vehicle configured to principally travel in either of two directions can obviate the need to include such door(s) on both lateral sides (e.g., because the autonomous vehicle can be configured to travel in a direction such that the passenger(s) can enter and/or exit the autonomous vehicle on the side opposite traffic, and/or the like). Having a single door for passenger ingress/egress (e.g., a single door on the curb side) can advantageously reduce vehicle weight and complexity.

According to one more particular aspect of the present disclosure, the platform is adaptable in size and/or configuration to dynamically implement one or more different autonomous vehicles having different sizes. For example, in some implementations, vehicle platforms can be designed to be able to change wheel bases at different extrusion lengths such that the same platform design can be adaptable for different autonomous vehicles. More particularly, one or more manufacturing techniques such as Designed For Manufacture (DMF) techniques can be employed to produce a platform having a reduced number of components, thus reducing the cost of both manufacture and in service use. In some implementations, one or more platform portions can be co-molded into a single component. In addition, platform portions can be extruded to different lengths to accommodate different wheelbases and internal package requirements. The platform and wheel bases can then fit to nodes that can be consistent across different platforms and vehicle lineups.

Additionally or alternatively, a platform can include one or more removable sections (e.g., additional portions positioned among first, second, third and fourth portions of a platform) so that platforms can be scalable and configurable on the fly to accommodate upper body structures of varied size. For example, the platform can include one or more additional portions configured for positioning among one or more of the first portion, the second portion, the third portion, and the fourth portion to form an expanded supporting structure for the autonomous vehicle. The expanded supporting structure including the additional portions can still be configured in a bisymmetrical arrangement. The expanded supporting structure can also be configured to receive an expanded body on top of the vehicle platform.

According to a more particular aspect of the present disclosure, an autonomous vehicle can include a plurality of wheel assemblies configured for secure positioning relative to each wheel mounting frame within a vehicle platform. In some implementations, the wheel mounting frame of each of the first portion, the second portion, the third portion and the fourth portion of a vehicle platform can respectively include a mounting arm extending laterally outward from the platform and a curved region adjacent to the mounting arm. Each curved region can be shaped to form a mounting recess configured to provide clearance for one of the plurality of wheel assemblies after being securely mounted to the mounting arm. In some implementations, each of the plurality of wheel assemblies includes a wheel (e.g., a wheel for mounting a pneumatic or non-pneumatic tire). In some implementations, each of the plurality of wheel assemblies further includes a wheel hub motor with integrated propulsion components, braking components, steering components, and suspension components. By providing in-wheel hub motors, the amount of potential intrusion space that powertrain and ancillary components introduce into the body of the autonomous vehicles can be reduced. In some implementations, each of the wheel assemblies can be configured to incorporate a highly articulating geometry to facilitate ease of maneuverability, especially relative to parking in tight spaces or the like. For example, each wheel assembly can include an articulating joint configured to operate the corresponding wheel and wheel hub motor within a range of motion greater than about 90 degrees.

More particularly, an autonomous vehicle can be a ground-based autonomous vehicle (e.g., car, truck, bus, etc.), or other types of vehicles (e.g., watercraft, rail-based vehicles, etc.). The autonomous vehicle can include an autonomy computing system that assists in controlling the autonomous vehicle. In some implementations, the autonomy computing system can include a perception system, a prediction system, and a motion planning system that cooperate to perceive the surrounding environment of the autonomous vehicle and determine a motion plan for controlling the motion of the autonomous vehicle accordingly.

In particular, in some implementations, the perception system can receive sensor data from one or more sensors that are coupled to or otherwise included within the autonomous vehicle. As examples, the one or more sensors can include a Light Detection and Ranging (LIDAR) system, a Radio Detection and Ranging (RADAR) system, one or more cameras (e.g., visible spectrum cameras, infrared cameras, etc.), a positioning system (e.g., GPS), and/or other sensors. The sensor data can include information that describes the location of objects within the surrounding environment of the autonomous vehicle. For example, the objects can include traffic signals, additional vehicles, pedestrians, bicyclists, and/or other objects. The sensor data can include raw sensor data and/or data that has been processed or manipulated in some manner before being provided to other systems within the autonomy computing system.

In addition to the sensor data, the perception system can retrieve or otherwise obtain map data that provides detailed information about the surrounding environment of the autonomous vehicle. The map data can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, and/or instructions of signage (e.g., stop sign or yield sign), traffic lights (e.g., stop light), or other traffic signals or control devices/markings (e.g., cross walks)); and/or any other map data that provides information that assists the computing system in comprehending and perceiving its surrounding environment and its relationship thereto.

The perception system can identify one or more objects that are proximate to the autonomous vehicle based on sensor data received from the one or more sensors and/or the map data. In particular, in some implementations, the perception system can provide, for one or more of the objects, state data that describes a current state of such object. As examples, the state data for each object can describe an estimate of the object's: current location (also referred to as position); current speed (also referred to as velocity); current acceleration, current heading; current orientation; size/footprint (e.g., as represented by a bounding polygon); class (e.g., vehicle vs. pedestrian vs. bicycle), and/or other state information.

The prediction system can receive the state data and can predict one or more future locations for the object(s) identified by the perception system. For example, various prediction techniques can be used to predict the one or more future locations for the object(s) identified by the perception system. The prediction system can provide the predicted future locations of the objects to the motion planning system. In some implementations, predictions are provided only for objects of certain class(es).

The motion planning system can determine a motion plan for the autonomous vehicle based at least in part on the state data provided by the perception system and/or the predicted one or more future locations for the objects. Stated differently, given information about the current locations of proximate objects and/or predictions about the future locations of proximate objects, the motion planning system can determine a motion plan for the autonomous vehicle that best navigates the vehicle relative to the objects at their current and/or future locations. As one example, the motion planning system can include a trajectory generator that generates a planned trajectory (e.g., a motion plan) for the autonomous vehicle.

The autonomy computing system can control the autonomous vehicle to implement the motion plan. For example, the motion planning system can provide the selected motion plan to a vehicle controller that controls one or more vehicle controls (e.g., actuators that control gas flow, steering, braking, etc.) to execute the selected motion plan until the next motion plan is generated.

According to a more particular aspect of the present disclosure, the disclosed autonomous vehicle can include an autonomous electric vehicle. More particularly, an autonomous electric vehicle can include an electric powertrain with one or more components such as a battery pack (e.g., a lithium-ion battery pack, a solid state battery pack, or the like). In some implementations, the battery pack is a removable battery pack. In some implementations, the removable battery pack is positioned at a central location of the platform, such as in an underfloor battery location that enables a substantially flat floor design which frees up internal volume to maximize adaptability and flexibility. A clean underfloor surface also provides aerodynamic efficiency as less need for air intakes reduces the number of body openings. In some implementations, the electric powertrain additionally includes a supercapacitor pack and an electric charge controller coupled to the supercapacitor pack and to the removable battery pack. The electric charge controller can be configured to control the charge and discharge of electric energy stored in the supercapacitor pack and in the battery pack based on one or more predetermined types of performance engaged in by the autonomous vehicle (e.g., acceleration bursts which may be better suited for charging by the supercapacitor pack or cruising which may be better suited for charging by the battery pack).

The technology described herein can provide a number of technical effects and benefits. For example, the arrangement described herein can enable vehicle platforms of varied size in a readily adaptable configuration for assembling different types of autonomous vehicles. Such a dynamic platform configuration can be particularly advantageous in the context of a fleet of autonomous vehicles serving varying demands, customers, markets, and/or the like. Moreover, the arrangement described herein can allow manufacture, operation, and/or the like of a fleet of autonomous vehicles of the same or varied models that can be utilized, reconfigured, and/or the like for different purposes, thereby reducing costs, simplifying management, supporting more adept services, and/or the like.

An additional technical effect and benefit is afforded by the arrangement described herein by providing a vehicle platform that is bisymmetrical. As such, the time, cost and expense of manufacturing and design across multiple platform sizes is reduced. In addition, a bi-directional vehicle having highly articulating wheel assemblies can maneuver more easily, especially in urban environments.

With reference now to the Figures, example embodiments of the present disclosure will be discussed in further detail.

FIG. 1 depicts an example autonomous vehicle according to example embodiments of the present disclosure.

Referring to FIG. 1, autonomous vehicle 10 can be capable of sensing its environment, navigating its environment with minimal or no human input, and/or the like. Autonomous vehicle 10 can be a ground-based autonomous vehicle (e.g., car, truck, bus, and/or the like), or other types of vehicles (e.g., watercraft, rail-based vehicles, etc.). Autonomous vehicle 10 can include one or more sensors 124, computing system 102, and one or more vehicle controls 126. Computing system 102 can assist in controlling autonomous vehicle 10. For example, computing system 102 can receive data generated by sensor(s) 124, attempt to comprehend an environment surrounding autonomous vehicle 10 by performing various processing techniques on the data generated by sensor(s) 124, generate, determine, select, and/or the like a motion plan for navigating autonomous vehicle 10 through, within, and/or the like such surrounding environment, and/or the like. Computing system 102 can interface with vehicle control(s) 126 to operate autonomous vehicle 10 (e.g., in accordance with the motion plan, and/or the like).

Computing system 102 can include one or more computing devices 104. Computing device(s) 104 can include circuitry configured to perform one or more operations, functions, and/or the like described herein. For example, computing device(s) 104 can include one or more processor(s) 112, one or more communication interfaces 114, and memory 116 (e.g., one or more hardware components for storing executable instructions, data, and/or the like). Communication interface(s) 114 can enable computing device(s) 104 to communicate with one another, and/or can enable autonomous vehicle 10 (e.g., computing system 102, computing device(s) 104, and/or the like) to communicate with one or more computing systems, computing devices, and/or the like distinct from autonomous vehicle 10 (e.g., computing system 108, and/or the like). Memory 116 can include (e.g., store, and/or the like) instructions 118 and data 120. When executed by processor(s) 112, instructions 118 can cause autonomous vehicle 10 (e.g., computing system 102, computing device(s) 104, and/or the like) to perform one or more operations, functions, and/or the like described herein. Data 120 can include, represent, and/or the like information associated with such operations, functions, and/or the like, data generated by sensor(s) 124, and/or the like.

Computing system 102 can be physically located onboard autonomous vehicle 10, and computing system 108 can be distinct and/or remotely located from autonomous vehicle 10. One or more networks 106 (e.g., wired networks, wireless networks, and/or the like) can interface autonomous vehicle 10 (e.g., computing system 102, computing device(s) 104, and/or the like) with computing system 108, which can include one or more computing devices analogous to computing device(s) 104, one or more components (e.g., memory, processors, communication interfaces, and/or the like) analogous to those of computing device(s) 104, and/or the like. Irrespective of attribution described or implied herein, unless explicitly indicated otherwise, the operations, functions, and/or the like described herein can be performed by computing system(s) 102 and/or 108 (e.g., by computing system 102, by computing system 108, by a combination of computing systems 102 and 108, and/or the like).

Computing system 102 can include positioning system 110, which can include one or more devices, circuitry, and/or the like for analyzing, approximating, determining, and/or the like one or more geographic positions of autonomous vehicle 10. For example, positioning system 110 can analyze, approximate, determine, and/or the like such position(s) using one or more inertial sensors, triangulations and/or proximities to network components (e.g., cellular towers, WiFi access points, and/or the like), satellite positioning systems, network addresses, and/or the like. Computing system 102 can include perception system 128, prediction system 130, and motion-planning system 132, which can cooperate to perceive a dynamic environment surrounding autonomous vehicle 10, generate, determine, select, and/or the like a motion plan for autonomous vehicle 10, and/or the like.

Perception system 128 can receive data from sensor(s) 124, which can be coupled to or otherwise included within autonomous vehicle 10. Sensor(s) 124 can include, for example, one or more cameras (e.g., visible spectrum cameras, infrared cameras, and/or the like), light detection and ranging (LIDAR) systems, radio detection and ranging (RADAR) systems, and/or the like. Sensor(s) 124 can generate data including information that describes one or more locations, velocities, vectors, and/or the like of objects in the environment surrounding autonomous vehicle 10. For example, a LIDAR system can generate data indicating the relative location (e.g., in three-dimensional space relative to the LIDAR system, and/or the like) of a number of points corresponding to objects that have reflected a ranging laser of the LIDAR system. Such a LIDAR system can, for example, measure distances by measuring the interference between outgoing and incoming light waves, measuring the time of flight (TOF) it takes a short laser pulse to travel from a sensor to an object and back, calculating the distance based at least in part on the TOF with respect to the known speed of light, based at least in part on a phase-shift with known wavelength, and/or the like. As another example, a RADAR system can generate data indicating one or more relative locations (e.g., in three-dimensional space relative to the RADAR system, and/or the like) of a number of points corresponding to objects that have reflected a ranging radio wave of the RADAR system. For example, radio waves (e.g., pulsed, continuous, and/or the like) transmitted by such a RADAR system can reflect off an object and return to a receiver of the RADAR system, generating data from which information about the object's location, speed, and/or the like can be determined. As another example, for one or more cameras, various processing techniques, for example, range-imaging techniques (e.g., structure from motion, structured light, stereo triangulation, and/or the like) can be performed to identify one or more locations (e.g., in three-dimensional space relative to the camera(s), and/or the like) of a number of points corresponding to objects depicted in imagery captured by the camera(s).

Perception system 128 can retrieve, obtain, and/or the like map data 122, which can provide information about an environment surrounding autonomous vehicle 10. For example, map data 122 can provide information regarding: the identity and location of different travel ways (e.g., roadways, and/or the like), road segments, buildings, other static items or objects (e.g., lampposts, crosswalks, curbing, and/or the like); the location and directions of traffic lanes (e.g., the location and/or direction of a parking lane, turning lane, bicycle lane, and/or the like); traffic-control data (e.g., the location and/or instructions of signage, traffic lights, other traffic-control devices, and/or the like); other map data providing information that can assist computing system 102 in comprehending, perceiving, and/or the like an environment surrounding autonomous vehicle 10, its relationship thereto, and/or the like.

Perception system 128 can (e.g., based at least in part on data received from sensor(s) 124, map data 122, and/or the like) identify one or more objects proximate to autonomous vehicle 10 and determine, for each of such object(s), state data describing a current state of the object, for example, an estimate of the object's: size/footprint (e.g., as represented by a bounding shape such as a polygon, polyhedron, and/or the like); class (e.g., vehicle, pedestrian, bicycle, and/or the like); current location (also referred to as position), speed (also referred to as velocity), acceleration, heading, orientation, yaw rate; and/or the like. In some embodiments, perception system 128 can determine such state data for each object over a number of iterations, for example, updating, as part of each iteration, the state data for each object. Accordingly, perception system 128 can detect, track, and/or the like such object(s) over time.

Prediction system 130 can receive state data from perception system 128 and can predict (e.g., based at least in part on such state data, and/or the like) one or more future locations for each object. For example, prediction system 130 can predict where each object will be located within the next five seconds, ten seconds, twenty seconds, and/or the like. As one example, an object can be predicted to adhere to its current trajectory according to its current speed. Additionally or alternatively, other prediction techniques, modeling, and/or the like can be used.

Motion-planning system 132 can generate, determine, select, and/or the like a motion plan for autonomous vehicle 10, for example, based at least in part on state data of object(s) provided by perception system 128, predicted future location(s) of object(s) provided by prediction system 130, and/or the like. For example, utilizing information about current location(s) of object(s), predicted future location(s) of object(s), and/or the like, motion-planning system 132 can generate, determine, select, and/or the like a motion plan for autonomous vehicle 10 that it determines (e.g., based at least in part on one or more operation parameters, and/or the like) best navigates autonomous vehicle 10 relative to the object(s). Motion-planning system 132 can provide the motion plan to vehicle-control system 134, which can directly and/or indirectly control autonomous vehicle 10 via vehicle control(s) 126 (e.g., one or more actuators, devices, and/or the like that control gas, power flow, steering, braking, and/or the like) in accordance with the motion plan.

Perception system 128, prediction system 130, motion-planning system 132, and/or vehicle-control system 134 can include logic utilized to provide functionality described herein. Perception system 128, prediction system 130, motion-planning system 132, and/or vehicle-control system 134 can be implemented in hardware (e.g., circuitry, and/or the like), firmware, software configured to control one or more processors, one or more combinations thereof, and/or the like. For example, instructions 118, when executed by processor(s) 112, can cause autonomous vehicle 10 (e.g., computing system 102, computing device(s) 104, and/or the like) to implement functionality of perception system 128, prediction system 130, motion-planning system 132, and/or vehicle-control system 134 described herein.

Figure 2:
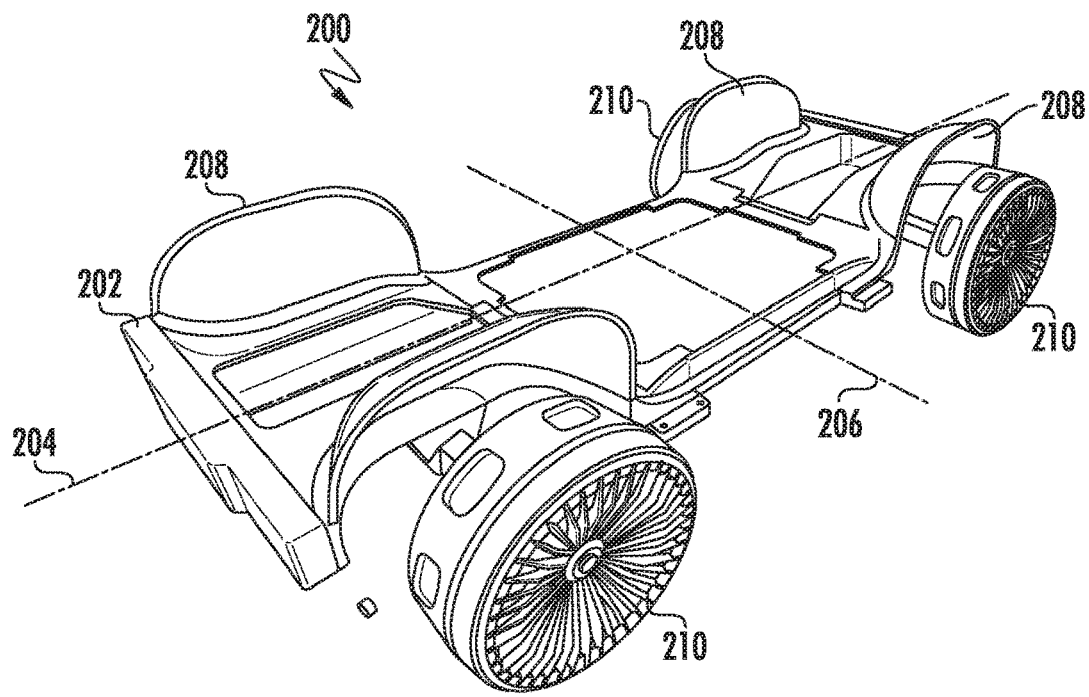
FIG. 2 depicts a first example representation of a vehicle platform of an autonomous vehicle according to example embodiments of the present disclosure.

FIG. 2 depicts a first example representation 200 of a vehicle platform of an autonomous vehicle according to example embodiments of the present disclosure. In particular, an autonomous vehicle can include a bisymmetrical platform 202 that accommodates formation of an autonomous vehicle that is replicated symmetrically across a vehicle centerline 204 and also symmetrically across a wheelbase midpoint plane 206. Respective portions of the bisymmetrical platform 202 are configured to provide a wheel mounting frame 208 configured for location of a respective plurality of wheel assemblies 210. The wheel assemblies 210 are securely positioned relative to each wheel mounting frame 208 within the bisymmetrical platform 202 and powered by a powertrain configured to operate an autonomous vehicle for bi-directional principal travel in either a forward direction or a rear direction.

Figure 3:
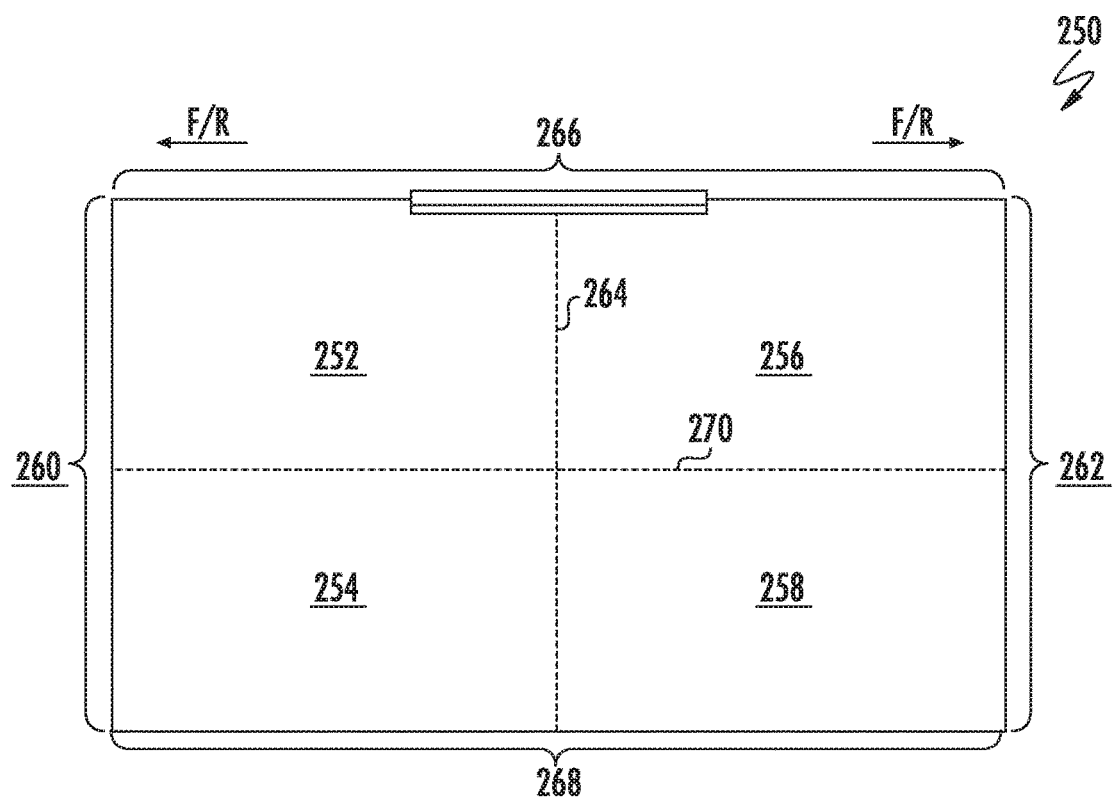
FIG. 3 depicts a second example representation of a vehicle platform of an autonomous vehicle according to example embodiments of the present disclosure.

FIG. 3 depicts an example representation of a vehicle platform 250 of an autonomous vehicle according to example embodiments of the present disclosure. Vehicle platform 250 is represented simplistically in FIG. 3 for purposes of representing its bisymmetrical characteristics, although it should be appreciated that the characteristics of vehicle platform 260 can be applied to or incorporated with other vehicle platform representations described herein. More particularly, an autonomous vehicle can include a vehicle platform 250 including a plurality of portions 252-258. For example, the vehicle platform 250 can include a first portion 252, a second portion 254, a third portion 256 and a fourth portion 258 that collectively provide a supporting structure (e.g., a vehicle frame or chassis) for the autonomous vehicle. In some implementations, each of the first portion 252, the second portion 254, the third portion 256, and the fourth portion 258 respectively comprise a wheel mounting frame (e.g., wheel mounting frame 208 of FIG. 2) configured for location of a wheel assembly (e.g., wheel assembly 210 of FIG. 2). In some implementations, the first portion 252 and the second portion 254 collectively serve as a front portion 260 of the vehicle platform 250 and the third portion 256 and the fourth portion 258 collectively serve as a rear portion 262 of the vehicle platform 250, such that front portion 260 and the rear portion 262 are symmetrical (e.g., symmetrical across a wheelbase midpoint plane 264). In some implementations, the first portion 252 and the third portion 256 collectively form a first lateral side portion 266 of the vehicle platform 250 and the second portion 254 and the fourth portion 258 collectively form a second lateral side portion 268 of the vehicle platform 250, such that the first lateral side portion 266 and the second lateral side portion 268 are symmetrical (e.g., symmetrical across a vehicle centerline 270).

Figure 4:
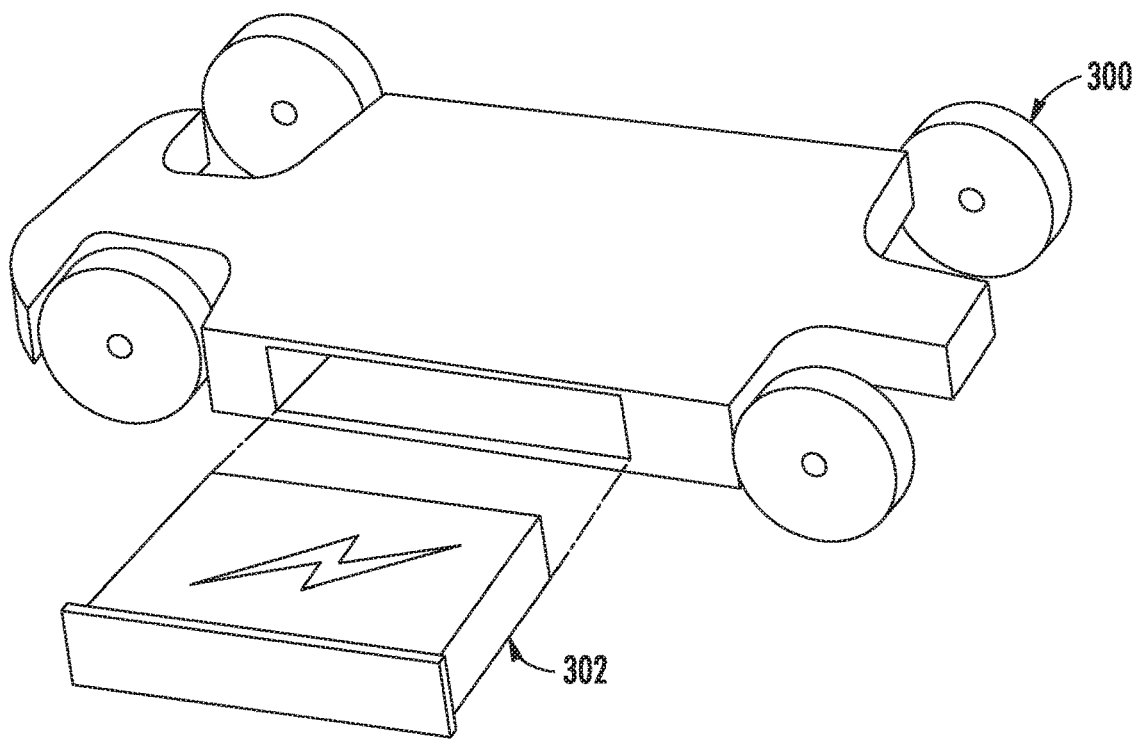
FIG. 4 depicts an example representation of a vehicle platform and battery pack according to example embodiments of the present disclosure.
Figure 5:
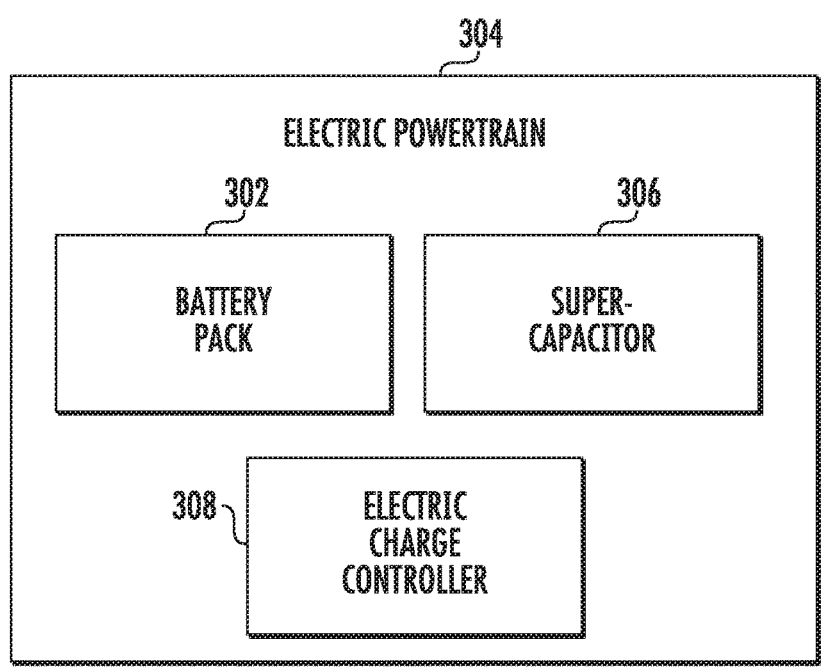
FIG. 5 depicts a block diagram of aspects of a vehicle powertrain according to example embodiments of the present disclosure.

FIGS. 4 and 5 depict example aspects of a vehicle platform 300 and associated powertrain system including a battery pack 302. More particularly, vehicle platform 300 can be used, for example, as a vehicle platform for an autonomous electric vehicle. More particularly, an autonomous electric vehicle can include an electric powertrain with one or more components such as battery pack 302 (e.g., a lithium-ion battery pack, a solid state battery pack, or the like). In some implementations, the battery pack 302 is a removable battery pack. In some implementations, the removable battery pack is positioned at a central location of the vehicle platform 300, such as in an underfloor battery location that enables a substantially flat floor design which frees up internal volume to maximize adaptability and flexibility. A clean underfloor surface also provides aerodynamic efficiency as less need for air intakes reduces the number of body openings. In some implementations, the electric powertrain 304 additionally includes a supercapacitor pack 306 and an electric charge controller 308 coupled to the supercapacitor pack 306 and to the battery pack 302. The electric charge controller 308 can be configured to control the charge and discharge of electric energy stored in the supercapacitor pack 306 and in the battery pack 302 based on one or more predetermined types of performance engaged in by the autonomous vehicle (e.g., acceleration bursts which may be better suited for charging by the supercapacitor pack or cruising which may be better suited for charging by the battery pack).

Figure 6:
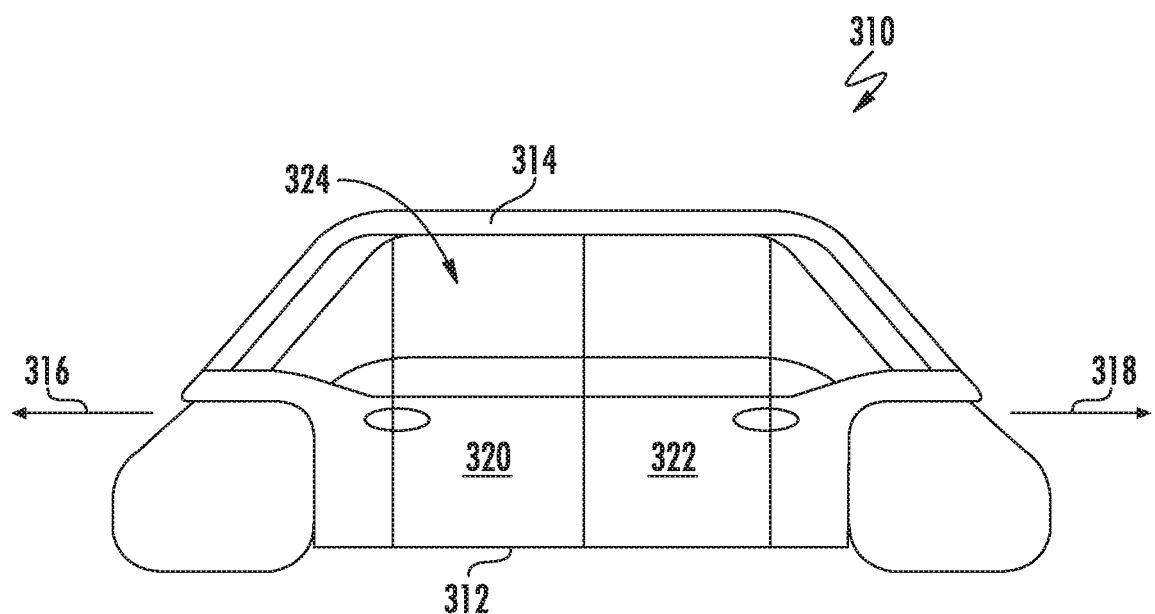
FIG. 6 depicts a first example representation of a bisymmetrical and bidirectional autonomous vehicle according to example embodiments of the present disclosure.
Figure 7:
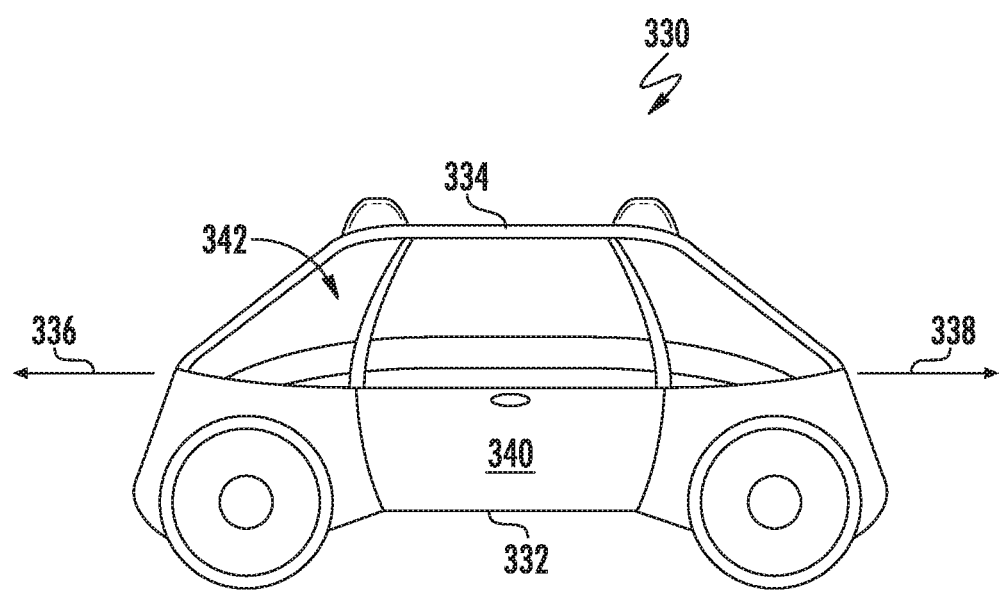
FIG. 7 depicts a second example representation of a bisymmetrical and bidirectional autonomous vehicle according to example embodiments of the present disclosure.

FIGS. 6 and 7 depict respective first and second example representations 310/330 of a bisymmetrical and bidirectional autonomous vehicle according to example embodiments of the present disclosure. More particularly, autonomous vehicle 310 of FIG. 6 includes an autonomous vehicle platform 312 configured for receiving a body 314 on top of the autonomous vehicle platform 312 and for functioning as part of an autonomous vehicle 310 configured to principally travel in either a forward direction or a rear direction. Similarly, autonomous vehicle 330 of FIG. 7 includes an autonomous vehicle platform 332 configured for receiving a body 334 on top of the autonomous vehicle platform 332 and for functioning as part of an autonomous vehicle 330 configured to principally travel in either a forward direction or a rear direction.

Each of the autonomous vehicles 310/330 can be configured to include an interior arrangement within its respective body 314/334 that is configured to receive passengers for transport. For example, an interior of each autonomous vehicle 310/330 can include multiple different interior portions. Each of such interior portions can include one or more mechanical interfaces for coupling one or more modular interior units to the interior of the body 310/330. For example, such modular interior units can be configured to accommodate one or more passengers of the autonomous vehicle 310/330 (e.g., via one or more included seats, and/or the like). The configuration of each vehicle platform 312/332 as well as additional powertrain components of autonomous vehicle 310/330 can be configured to provide enhanced interior volume for the body 314/334, thus accommodating more spacious transport area for passengers or other cargo and allowing flexibility for different use cases.

In some more particular embodiments, each autonomous vehicle 310/330 (and/or the body 314/334 portion thereof) can include multiple sides. In some implementations, the autonomous vehicle 310/330 and/or body 314/334 of the autonomous vehicle 310/330 can include one or more sides corresponding to either the front or the rear of the autonomous vehicle 310/330. For example, autonomous 310/330 vehicle can be configured to principally travel in either of two directions (e.g., a first direction 316/336 and/or a rear direction 318/338). Autonomous vehicle 310/330 can thus be equally suited to travel in a forward direction and a read direction since the front and rear of the autonomous vehicle 310/330 can be interchangeable, indistinguishable, and/or the like. In addition to the front/rear sides, the autonomous vehicle 310/330 and/or body 314/334 can include lateral sides (e.g., first and second lateral sides) connecting the front/rear sides.

With more particular reference to FIG. 6, autonomous vehicle 310 includes a first door 320 and a second door 322, both of which are positioned on a first lateral side 324 of the autonomous vehicle 310. First door 320 and second door 322 are configured to provide panels configured to open and/or close as desired such that one or more passengers can enter and/or exit the autonomous vehicle 310. In some embodiments, first door 320 and second door 322 are positioned on first lateral side 324, while the second lateral side of autonomous vehicle 310 may not include such door(s). For example, an autonomous vehicle configured to principally travel in either of two directions can obviate the need to include such door(s) on both lateral sides (e.g., because the autonomous vehicle can be configured to travel in a direction such that the passenger(s) can enter and/or exit the autonomous vehicle on the side opposite traffic, and/or the like). Having doors on a single lateral side for passenger ingress/egress (e.g., first door 320 and second door 322 on the curb side (e.g., first lateral side 324)) can advantageously reduce weight and complexity of autonomous vehicle 310. Although only first lateral side 324 of autonomous vehicle 310 is visible in FIG. 6, it should be appreciated that the body 314 of autonomous vehicle 310 can additionally or alternatively include one or more additional doors on the other lateral side of autonomous vehicle 310 when desired.

With more particular reference to FIG. 7, autonomous vehicle 330 includes a door 340 positioned on a first lateral side 342 of the autonomous vehicle 330. Door 340 is configured to provide a panel configured to open and/or close as desired such that one or more passengers can enter and/or exit the autonomous vehicle 330. In some embodiments, door 340 is positioned on first lateral side 342, while the second lateral side of autonomous vehicle 310 may not include such door(s). For example, an autonomous vehicle configured to principally travel in either of two directions can obviate the need to include such door(s) on both lateral sides (e.g., because the autonomous vehicle can be configured to travel in a direction such that the passenger(s) can enter and/or exit the autonomous vehicle on the side opposite traffic, and/or the like). Having doors on a single lateral side for passenger ingress/egress (e.g., first door 316 and second door 318 on the curb side (e.g., first lateral side 320)) can advantageously reduce weight and complexity of autonomous vehicle 310. Although only first lateral side 320 of autonomous vehicle 310 is visible in FIG. 6, it should be appreciated that the body 314 of autonomous vehicle 310 can additionally or alternatively include one or more additional doors on the other lateral side of autonomous vehicle 310 when desired.

Figure 8:
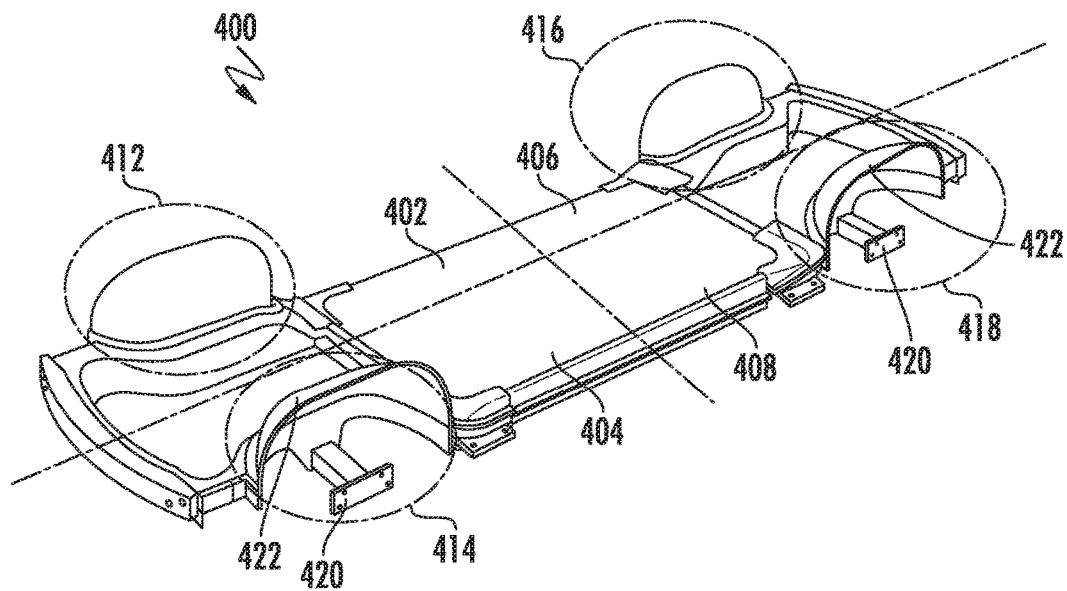
FIG. 8 depicts a third example representation of a vehicle platform of an autonomous vehicle according to example embodiments of the present disclosure.

FIG. 8 depicts a third example representation of a vehicle platform of an autonomous vehicle according to example embodiments of the present disclosure. More particularly, vehicle platform 400 includes a plurality of wheel mounting frames configured to receive and securely position a wheel assembly (not illustrated). Vehicle platform 400 includes a first portion 402, second portion 404, third portion 406, and fourth portion 408, each of which respectively include a wheel mounting frame 412-418. Each wheel mounting frame 412-418 respectively includes a mounting arm 420 extending laterally outward from the vehicle platform 400 and a curved region 422 adjacent to the mounting arm 420. Each curved region 422 can be shaped to form a mounting recess configured to provide clearance for one of the plurality of wheel assemblies after being securely mounted to the mounting arm 420.

Referring still to FIG. 8, vehicle platform 400 can include one or more lightweight, recyclable, and/or sustainable materials (e.g., aluminum extrusion, aluminum casting, sheet-molding component (SMC) or other suitable materials). Lighter components can advantageously require less structure which in turn requires less energy to move, so performance and mass can be balanced. In some implementations, the vehicle platform 400 can include aluminum extrusions with cast aluminum or additive layered built up nodes. Panels of the vehicle platform 400 and/or body (e.g., body 314/334 of FIGS. 6-7) can include SMC panels having a bonded and riveted construction. Bonding using ambient temperature curing and riveting can advantageously reduce manufacturing energy requirements. Low toxicity coatings and reduction of volatile organic compounds (VOCs) can be incorporated to lessen environmental impact.

Figure 9:
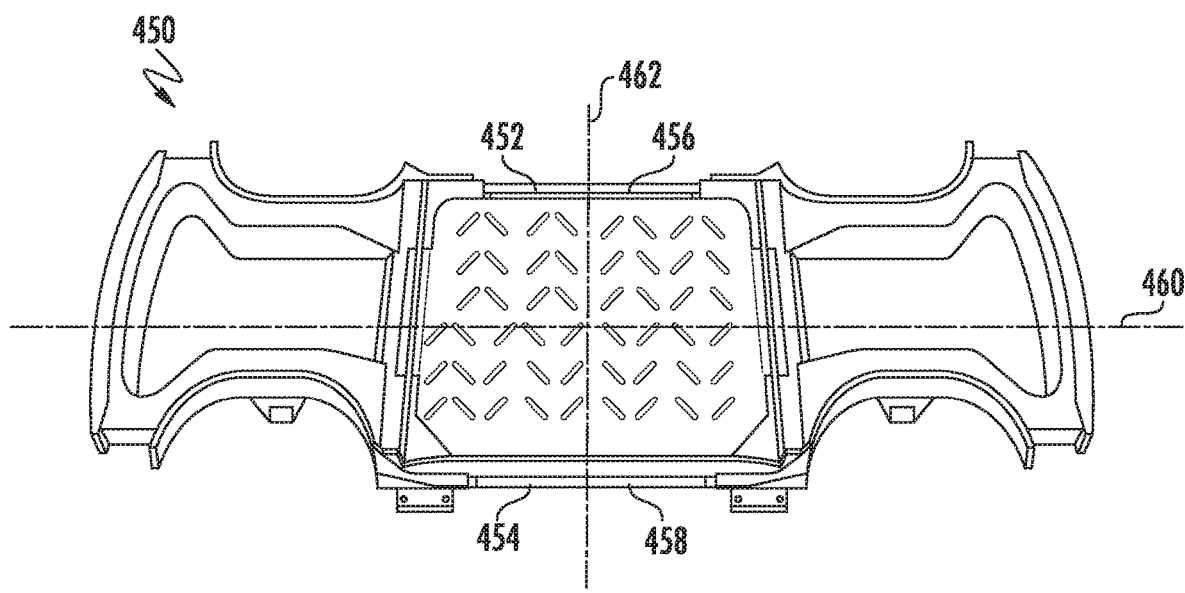
FIG. 9 depicts a fourth example representation of a vehicle platform of an autonomous vehicle according to example embodiments of the present disclosure.
Figure 10:
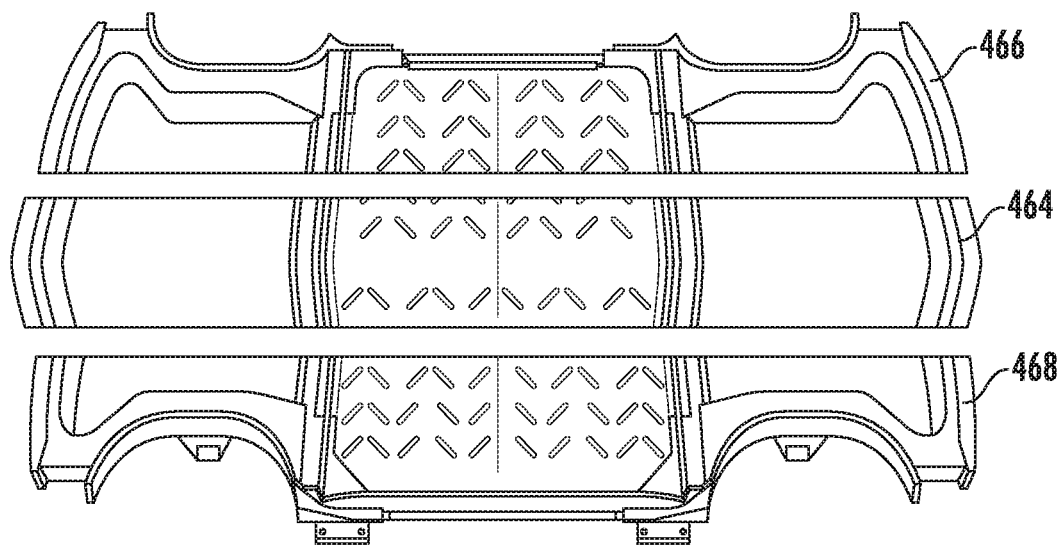
FIG. 10 depicts a fifth example representation of a vehicle platform of an autonomous vehicle according to example embodiments of the present disclosure.
Figure 11:
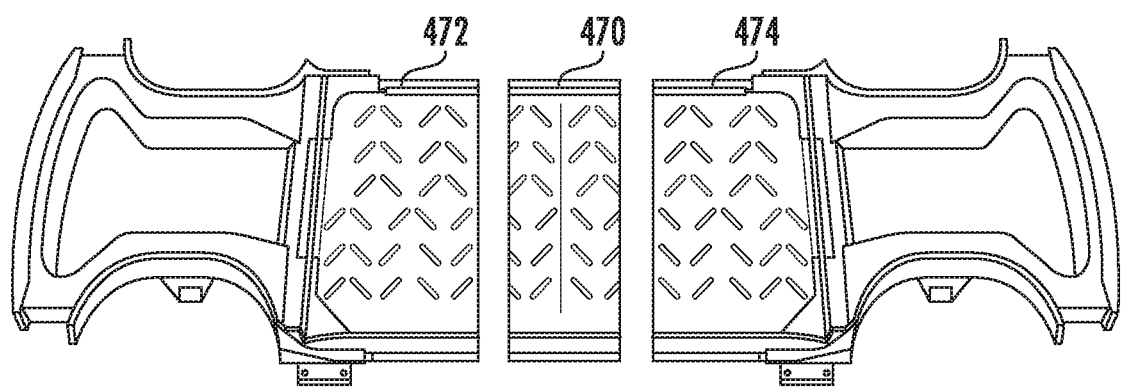
FIG. 11 depicts a sixth example representation of a vehicle platform of an autonomous vehicle according to example embodiments of the present disclosure.

Referring now to FIGS. 9-12, aspects of example vehicle platforms are depicted to Illustrate how a platform can be adaptable in size and/or configuration to dynamically implement one or more different autonomous vehicles having different sizes. With more particular reference to FIGS. 9-11, a vehicle platform can include one or more removable sections (e.g., additional portions positioned among first, second, third and fourth portions of a vehicle platform) so that platforms can be scalable and configurable on the fly to accommodate upper body structures of varied size. FIG. 9 illustrates an example vehicle platform 450 that includes a first portion 452, second portion 454, third portion 456, and fourth portion 458. In some implementations, the first portion 452, second portion 454, third portion 456, and fourth portion 458 combine to form a bisymmetrical vehicle platform 450 as described herein. In some implementations, one or more of the first portion 452, second portion 454, third portion 456, and fourth portion 458 are distinct components that can be separated from one another to accommodate the inclusion of additional portions to form an expanded supporting structure. For example, in some implementations vehicle platform 450 of FIG. 9 can be separated along vehicle centerline 460 to accommodate one or more additional portions as shown in FIG. 10. Additionally or alternatively, vehicle platform 450 of FIG. 9 can be separated along wheelbase midpoint plane 462 to accommodate one or more additional portions as shown in FIG. 11. When a platform includes one or more additional portions positioned among one or more of the first portion, the second portion, the third portion, and the fourth portion to form an expanded supporting structure for the autonomous vehicle, the expanded supporting structure including the additional portions can still be configured in a bisymmetrical arrangement. The expanded supporting structure can also be configured to receive an expanded body on top of the vehicle platform.

FIG. 10 depicts an expanded view of the vehicle platform 450 of FIG. 9 after being separated along vehicle centerline 460 and including an additional portion 464. More particularly, a first lateral side portion 466 (e.g., including first portion 452 and third portion 456 of vehicle platform 450 of FIG. 9) can be separated from second lateral side portion 468 (e.g., including second portion 454 and fourth portion 458 of vehicle platform 450 of FIG. 9) along the vehicle centerline 460. This separation can then accommodate the inclusion of an additional portion 464 in between the first lateral side portion 466 and second lateral side portion 468. Additional portion 464, first lateral side portion 466, and second lateral side portion 468 can then be securely affixed together to form an expanded vehicle platform that includes a greater width dimension than vehicle platform 450 of FIG. 9. This expanded vehicle platform of FIG. 10 can be configured to receive a larger body resulting in an autonomous vehicle having different dimensions than one built from the vehicle platform 450 of FIG. 9.

FIG. 11 depicts an expanded view of vehicle platform 450 of FIG. 9 after being separated along wheelbase midpoint plane 462 and including additional portion 470. The additional portion 470 illustrated in FIG. 11 can be included additionally or alternatively relative to the additional portion 464 of FIG. 10. With more particular reference to FIG. 11, a front portion 472 (e.g., including first portion 452 and second portion 454 of vehicle platform 450 of FIG. 9) can be separated from rear portion 474 (e.g., including third portion 456 and fourth portion 458 of vehicle platform 450 of FIG. 9) along the wheelbase midpoint plane 462. This separation can then accommodate the inclusion of an additional portion 470 in between the front portion 472 and rear portion 474. Additional portion 470, front portion 472, and rear portion 474 can then be securely affixed together to form an expanded vehicle platform that includes a greater length dimension than vehicle platform 450 of FIG. 9. This expanded vehicle platform of FIG. 11 can be configured to receive a larger body resulting in an autonomous vehicle having different dimensions than one built from the vehicle platform 450 of FIG. 9.

Figure 12:
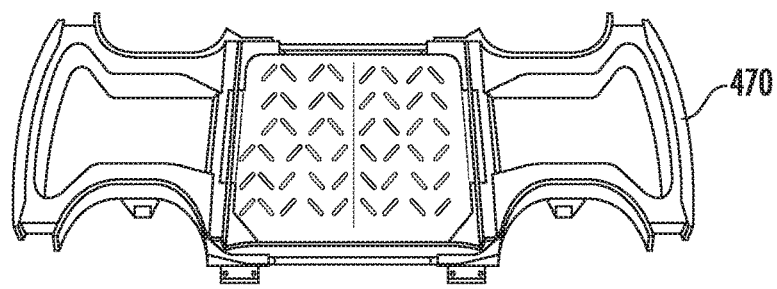
FIG. 12 depicts an example representation of different extrusion lengths for vehicle platform of an autonomous vehicle according to example embodiments of the present disclosure.
Figure 12:
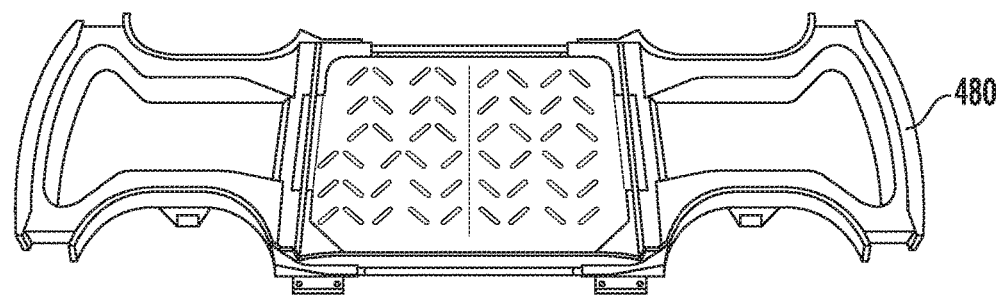
Figure 12:
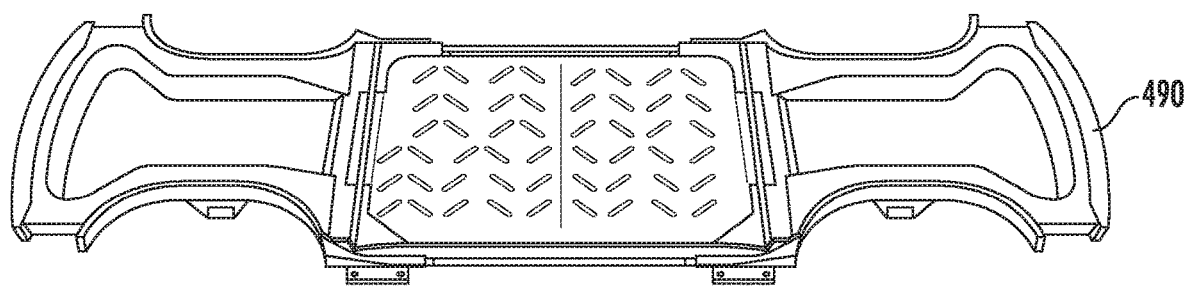

FIG. 12 depicts an example representation of different extrusion lengths for vehicle platforms of an autonomous vehicle according to example embodiments of the present disclosure. More particularly, vehicle platforms in accordance with the disclosed technology can be manufactured using one or more manufacturing techniques such as Designed For Manufacture (DMF) techniques. A DFM technique used for vehicle platform manufacture can be employed to produce a platform having a reduced number of components, thus reducing the cost of both manufacture and in service use. In some implementations, one or more platform portions can be co-molded into a single component. In addition, platform portions can be extruded to different lengths to accommodate different wheelbases and internal package requirements. The platform and wheel bases can then fit to nodes that can be consistent across different platforms and vehicle lineups. More particularly, FIG. 12 depicts a first vehicle platform 470, second vehicle platform 480, and third vehicle platform 490 that are similar co-molded components that can be designed for extrusion at different lengths. For example, a lineup of fleet vehicles may include a first vehicle having a first length and that is built on first vehicle platform 470, a second vehicle having a second length and that is built on second vehicle platform 480, and a third vehicle having a third length and that is built on third vehicle platform, each vehicle requiring a vehicle platform and upper body having a distinct length. By creating different structural elements in the form of extrusions (e.g., aluminium extrusions) configured for implementation at different lengths, vehicle platforms (e.g., first vehicle platform 470, second vehicle platform 480, and third vehicle platform 490) can be made to accommodate various wheelbases and internal package requirements.

Figure 13:
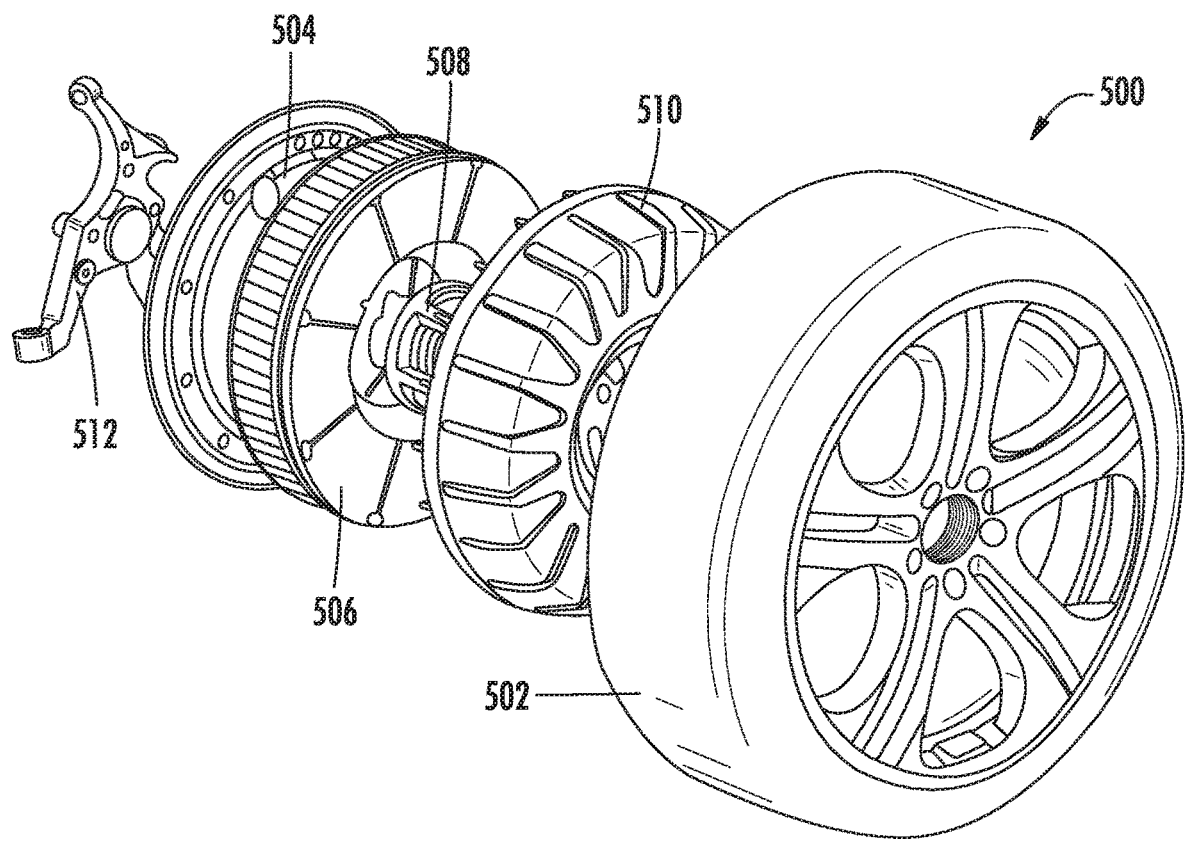
FIG. 13 depicts an example hub motor wheel assembly for an autonomous vehicle according to example embodiments of the present disclosure.

FIG. 13 depicts an example hub motor wheel assembly for an autonomous vehicle according to example embodiments of the present disclosure. For example, an autonomous vehicle 10 of FIG. 1 can include a plurality of hub motor wheel assemblies 500. In some implementations, each of the plurality of hub motor wheel assemblies 500 includes a wheel 502 (e.g., an alloy wheel for mounting a pneumatic or non-pneumatic tire). In some implementations, each of the plurality of wheel assemblies 500 further includes a wheel hub motor with integrated propulsion components, braking components, steering components, and suspension components. For example, a wheel hub motor can include a stator 504, coils and power electronics/micro inverters 506, a wheel bearing 508, and rotor 510 collectively coupled to vehicle suspension 512. By providing in-wheel hub motors, the amount of potential intrusion space that powertrain and ancillary components introduce into the body of the autonomous vehicles can be reduced. In some implementations, each of the hub motor wheel assemblies 500 can be configured to incorporate a highly articulating geometry to facilitate ease of maneuverability, especially relative to parking in tight spaces or the like. For example, each hub motor wheel assembly 500 can include an articulating joint configured to operate the corresponding wheel and wheel hub motor within a range of motion greater than about 90 degrees. In some implementations, each hub motor wheel assembly is configured to provide about 55 kW or more of power with a max torque rating of about 1000 Nm.

Figure 14:
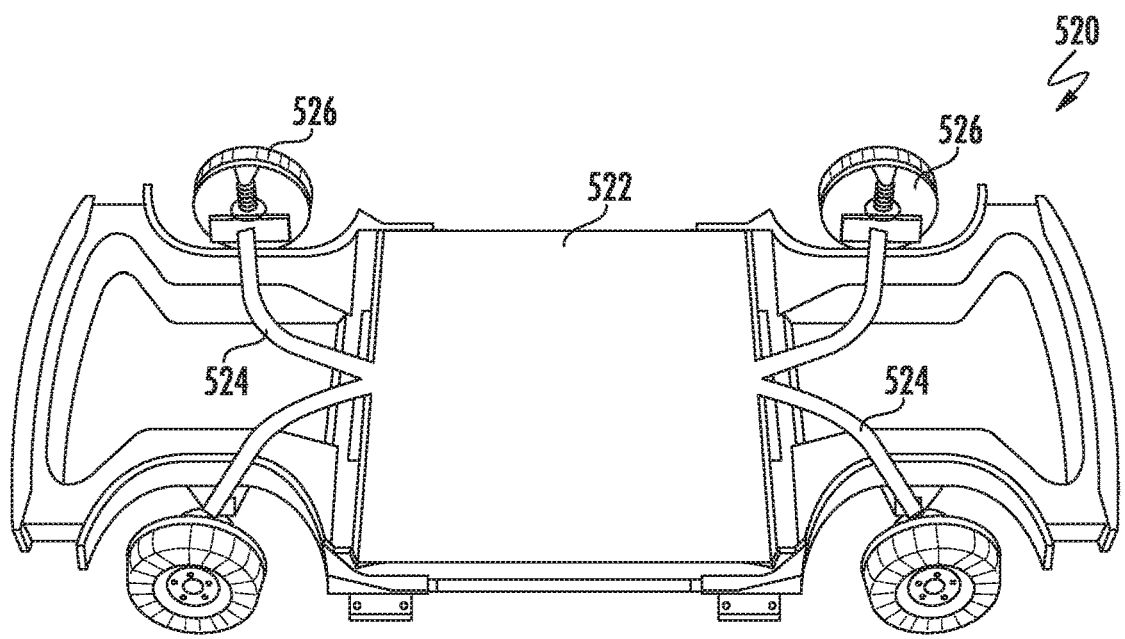
FIG. 14 depicts a representation of an electric battery pack for an autonomous vehicle according to example embodiments of the present disclosure.

FIG. 14 depicts a representation of an electric battery pack for an autonomous vehicle according to example embodiments of the present disclosure. More particularly, vehicle platform 520 is configured for use with an autonomous electric vehicle that includes an electric powertrain with one or more components such as a battery pack 522 (e.g., a lithium-ion battery pack, a solid state battery pack, or the like). In some implementations, the battery pack 522 is a removable battery pack. In some implementations, the removable battery pack is positioned at a central location of the platform 520, such as in an underfloor battery location that enables a substantially flat floor design which frees up internal volume to maximize adaptability and flexibility. A clean underfloor surface also provides aerodynamic efficiency as less need for air intakes reduces the number of body openings. A plurality of electric couplings 524 can respectively provide electric connection from the battery pack 522 to each of a plurality of hub motor wheel assemblies 526 such that additional traditional engine components are not required within an electric autonomous vehicle utilizing the vehicle platform 520. In some implementations, battery pack 522 corresponds to a battery pack having a rating of between about 75 kWh and about 350 kWh configured to accommodate daily driving distances on a single charge of between about 160-320 km.

Figure 15:
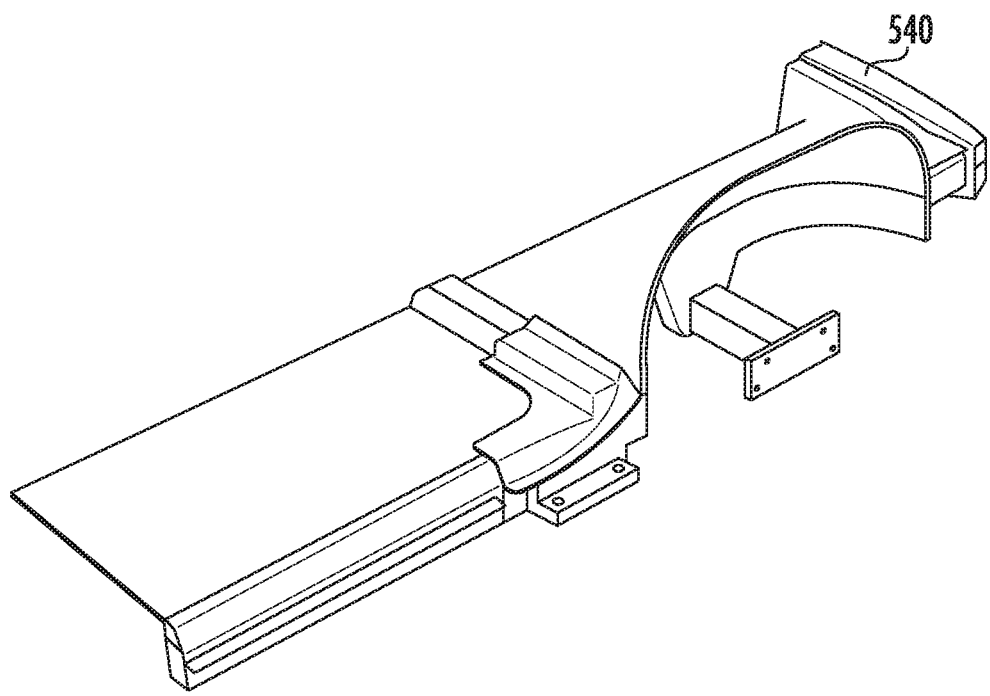
FIG. 15 depicts an example representation of a portion of a vehicle platform of an autonomous vehicle according to example embodiments of the present disclosure.
Figure 16:
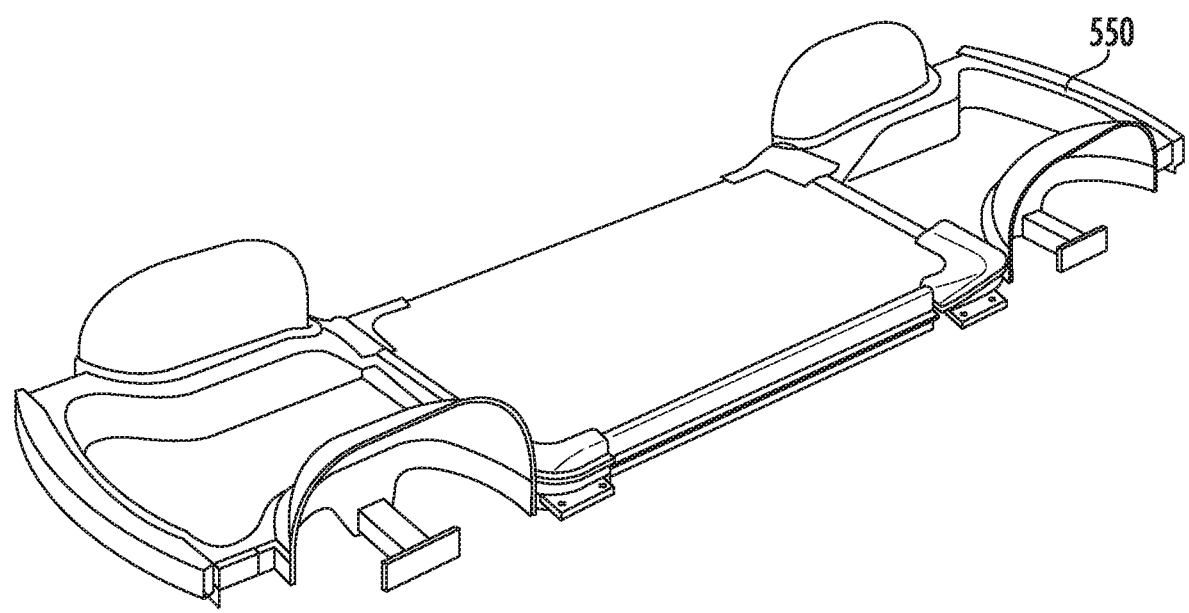
FIG. 16 depicts a sixth example representation of a vehicle platform of an autonomous vehicle according to example embodiments of the present disclosure.

FIG. 15 depicts an example representation of a portion 540 of a vehicle platform of an autonomous vehicle according to example embodiments of the present disclosure, while FIG. 16 depicts an example vehicle platform 550 formed by replication of portion 540 in four quadrants of vehicle platform 550 in a bisymmetrical fashion. For example portion 540 can correspond in some implementations to each of the first portion 252, second portion 254, third portion 256 and fourth portion 258 of FIG. 3 that collectively provide a supporting structure (e.g., a vehicle frame or chassis) for the autonomous vehicle. The multiple symmetrical portions 540 can be co-molded or securely combined to form vehicle platform 550. The bisymmetrical platform 550 accommodates formation of an autonomous vehicle that is replicated symmetrically across a vehicle centerline and also symmetrically across a wheelbase midpoint plane.

Figure 17:
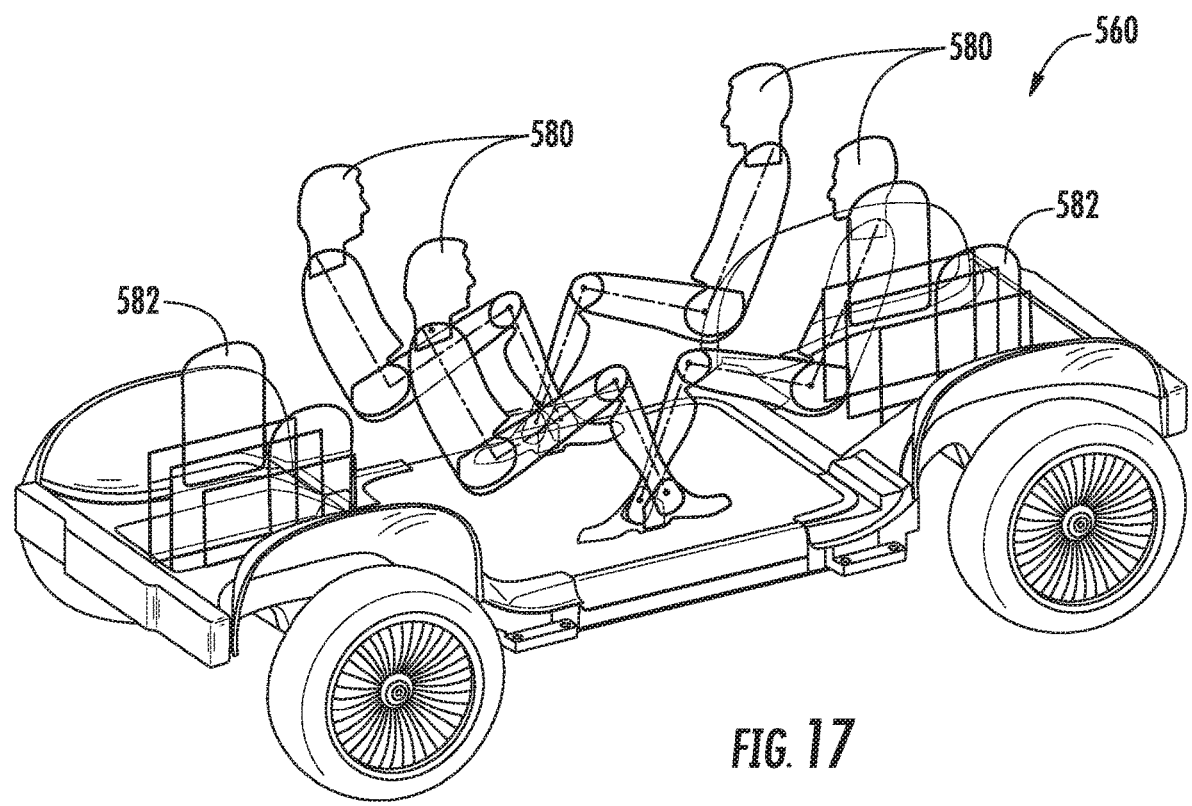
FIG. 17 depicts a seventh example representation of a vehicle platform of an autonomous vehicle according to example embodiments of the present disclosure.
Figure 18:
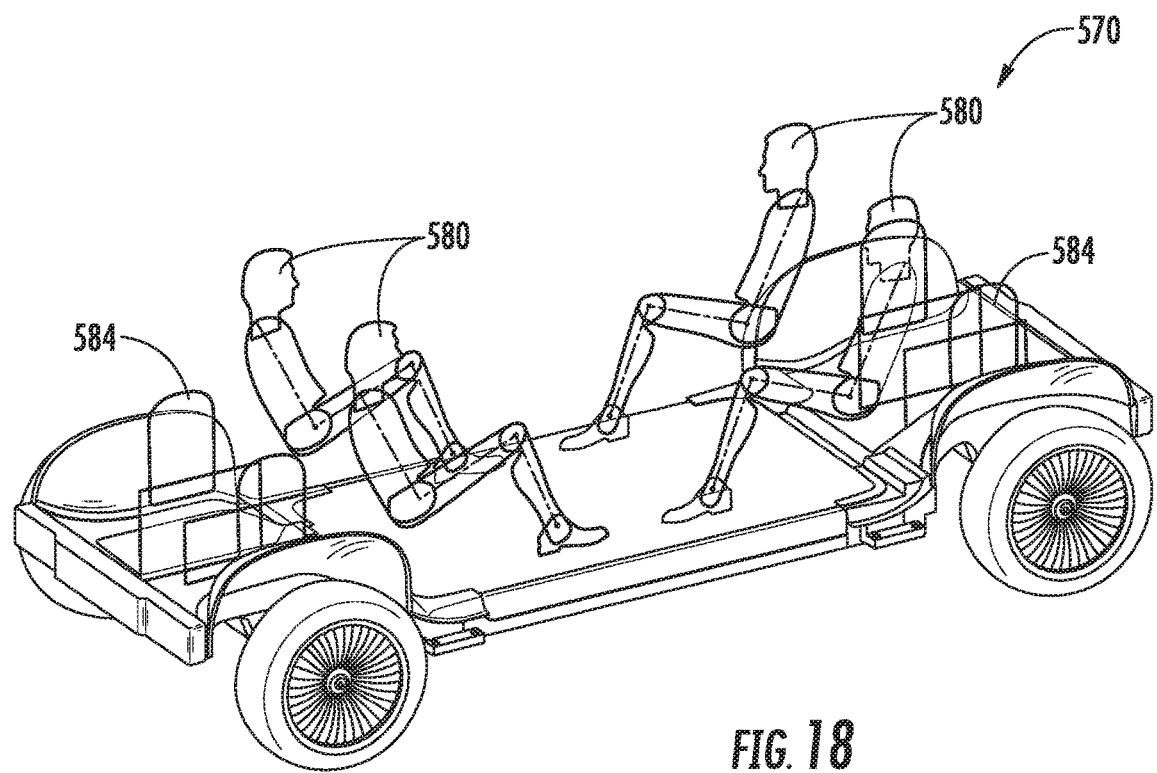
FIG. 18 depicts an eighth example representation of a vehicle platform of an autonomous vehicle according to example embodiments of the present disclosure.

FIGS. 17 and 18 depict respective embodiments of example vehicle platform representations that depict the inclusion of passengers within a corresponding interior portion of an autonomous vehicle. More particularly, vehicle platform 560 of FIG. 17 and vehicle platform 570 of FIG. 18 respectively depict passengers 580 positioned within a corresponding vehicle interior. A vehicle interior associated with vehicle platform 560 of FIG. 17 can include first and second opposing seat structures 582, each of which can be configured for receiving one or more passengers (e.g., two passengers per seat structure 582 for a total of four passengers). Similarly, a vehicle interior associated with vehicle platform 570 of FIG. 18 can include first and second opposing seat structures 584, each of which can be configured for receiving one or more passengers (e.g., two passengers per seat structure 584 for a total of four passengers). Passengers positioned on opposing seat structures 582/584 can be configured to face one another within the vehicle interior. Vehicle platforms 560 and 570 are designed with different lengths such that the distance between opposing seat structures 584 in FIG. 18 is greater than the distance between opposing seat structures 582 of FIG. 17. Seat structures 582 and/or 584 can correspond to a variety of different configurations including but not limited to reclining seat structures, bench seat structures, bucket seat structures, electrically adjustable seat structures, and others.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. An autonomous vehicle, comprising:
    a bisymmetrical platform comprising a first portion, a second portion, a third portion, and a fourth portion that are joined together and collectively provide a supporting structure for the autonomous vehicle, wherein each of the first portion, the second portion, the third portion and the fourth portion respectively are individually separable from the supporting structure and comprise a wheel mounting frame configured for location of a wheel assembly, and wherein one or more of the first portion, the second portion, the third portion, or the fourth portion are configured to join one or more additional portions to expand the supporting structure;
    a body positioned on top of the bisymmetrical platform configured to receive passengers for transport, the body including a front side, a rear side, and first and second lateral sides connecting the front side and the rear side;
    a plurality of wheel assemblies configured for secure positioning relative to each wheel mounting frame within the bisymmetrical platform; and
    a powertrain configured to power the plurality of wheel assemblies for operation of the autonomous vehicle to travel in either a forward direction or a rear direction.

2. The autonomous vehicle of claim 1, wherein the body comprises a door on only one of the first and second lateral sides.

3. The autonomous vehicle of claim 1, wherein the wheel mounting frame of each of the first portion, the second portion, the third portion and the fourth portion respectively comprises:
    a mounting arm extending laterally outward from the bisymmetrical platform; and
    a curved region adjacent to the mounting arm, the curved region being shaped to form a mounting recess configured to provide clearance for one of the plurality of wheel assemblies after being securely mounted to the mounting arm.

4. The autonomous vehicle of claim 1, wherein the powertrain comprises an electric powertrain comprising a battery pack.

5. The autonomous vehicle of any of claim 4, wherein the battery pack comprises one or more of a lithium ion battery pack and a solid state battery pack.

6. The autonomous vehicle of claim 4, wherein the electric powertrain comprises:
    a supercapacitor pack; and
    an electric charge controller coupled to the supercapacitor pack and to the battery pack, the electric charge controller configured to control the charge and discharge of electric energy stored in the supercapacitor pack and in the battery pack based on one or more predetermined types of performance engaged in by the autonomous vehicle.

7. The autonomous vehicle of claim 4, wherein the battery pack comprises a removable battery pack that is positioned at a central location of the bisymmetrical platform.

8. The autonomous vehicle of claim 1, wherein each of the plurality of wheel assemblies comprises a wheel and a wheel hub motor with integrated propulsion components, braking components, steering components, and suspension components.

9. The autonomous vehicle of claim 8, wherein each of the plurality of wheel assemblies comprises an articulating joint configured to operate the corresponding wheel and wheel hub motor within a range of motion greater than about 90 degrees.

10. An autonomous vehicle platform, comprising:
    a first portion, a second portion, a third portion, and a fourth portion that are joined together and collectively provide a supporting structure for an autonomous vehicle, wherein each of the first portion, the second portion, the third portion and the fourth portion respectively are individually separable from the supporting structure and comprises a wheel mounting frame configured for location of a wheel assembly, and wherein one or more of the first portion, the second portion, the third portion, or the fourth portion are configured to join one or more additional portions to expand the supporting structure;
    wherein the first portion and the second portion collectively serve as a front portion of the autonomous vehicle platform and the third portion and the fourth portion collectively serve as a rear portion of the autonomous vehicle platform, wherein the front portion and the rear portion are symmetrical;
    wherein the first portion and the third portion collectively form a first lateral side portion of the autonomous vehicle platform and the second portion and the fourth portion collectively form a second lateral side portion of the autonomous vehicle platform, wherein the first lateral side portion and the second lateral side portion are symmetrical; and wherein the autonomous vehicle platform is configured for receiving a symmetrical body on top of the autonomous vehicle platform and for functioning as part of the autonomous vehicle configured to travel in either a forward direction or a rear direction.

11. The autonomous vehicle platform of claim 10, wherein the one or more additional portions are configured for positioning among one or more of the first portion, the second portion, the third portion, and the fourth portion to form an expanded supporting structure for the autonomous vehicle, and wherein the expanded supporting structure is configured to receive an expanded symmetrical body on top of the autonomous vehicle platform.

12. The autonomous vehicle platform of claim 10, wherein:
the symmetrical body is configured to receive one or more passengers for transport, the body including a front side, a rear side, and first and second lateral sides connecting the front side and the rear side; and
the symmetrical body comprises a door on only one of the first and second lateral sides.

13. The autonomous vehicle platform of claim 10, wherein the wheel mounting frame of each of the first portion, the second portion, the third portion and the fourth portion respectively comprises:
a mounting arm extending laterally outward from the autonomous vehicle platform; and
a curved region adjacent to the mounting arm, the curved region being shaped to form a mounting recess configured to provide clearance for a wheel assembly; and
a wheel assembly configured for secure positioning to the mounting arm.

14. The autonomous vehicle platform of claim 10, wherein each wheel assembly comprises a wheel and a wheel hub motor with integrated propulsion components, braking components, steering components, and suspension components.

15. The autonomous vehicle platform of claim 14, wherein each wheel assembly comprises an articulating joint configured to operate the corresponding wheel and wheel hub motor within a range of motion greater than about 90 degrees.

16. An electric autonomous vehicle, comprising:
a bisymmetrical platform comprising a first portion, a second portion, a third portion and a fourth portion that are joined together and collectively provide a supporting structure for the electric autonomous vehicle, wherein each of the first portion, the second portion, the third portion and the fourth portion respectively are individually separable from the supporting structure and comprise a wheel mounting frame configured for location of a wheel assembly, wherein one or more of the first portion, the second portion, the third portion, or the fourth portion are configured to join one or more additional portions to expand the supporting structure, wherein the first portion and the second portion collectively serve as a front portion of the bisymmetrical platform and the third portion and the fourth portion collectively serve as a rear portion of the bisymmetrical platform, wherein the front portion and the rear portion are symmetrical, and wherein the first portion and the third portion collectively form a first lateral side portion of the bisymmetrical platform and the second portion and the fourth portion collectively form a second lateral side portion of the bisymmetrical platform, wherein the first lateral side portion and the second lateral side portion are symmetrical;
a body positioned on top of the bisymmetrical platform configured to receive one or more passengers for transport, the body including a front side, a rear side, and first and second lateral sides connecting the front side and the rear side;
a plurality of wheel assemblies configured for secure positioning relative to each wheel mounting frame within the bisymmetrical platform; and
an electric powertrain configured to power the plurality of wheel assemblies for operation of the electric autonomous vehicle to travel in either a forward direction or a rear direction.

17. The electric autonomous vehicle of claim 16, wherein the body comprises a door on only one of the first and second lateral sides.

18. The electric autonomous vehicle of claim 16, wherein the electric powertrain comprises a battery pack comprising one or more of a lithium ion battery pack and a solid state battery pack.

19. The electric autonomous vehicle of claim 18, wherein the electric powertrain comprises:
a supercapacitor pack; and
an electric charge controller coupled to the supercapacitor pack and to the battery pack, the electric charge controller configured to control a charge and discharge of electric energy stored in the supercapacitor pack and in the battery pack based on one or more predetermined types of performance engaged in by the electric autonomous vehicle.

20. The electric autonomous vehicle of claim 18, wherein the battery pack comprises a removable battery pack that is positioned at a central location of the bisymmetrical platform.

* * * * *